Figure 1:
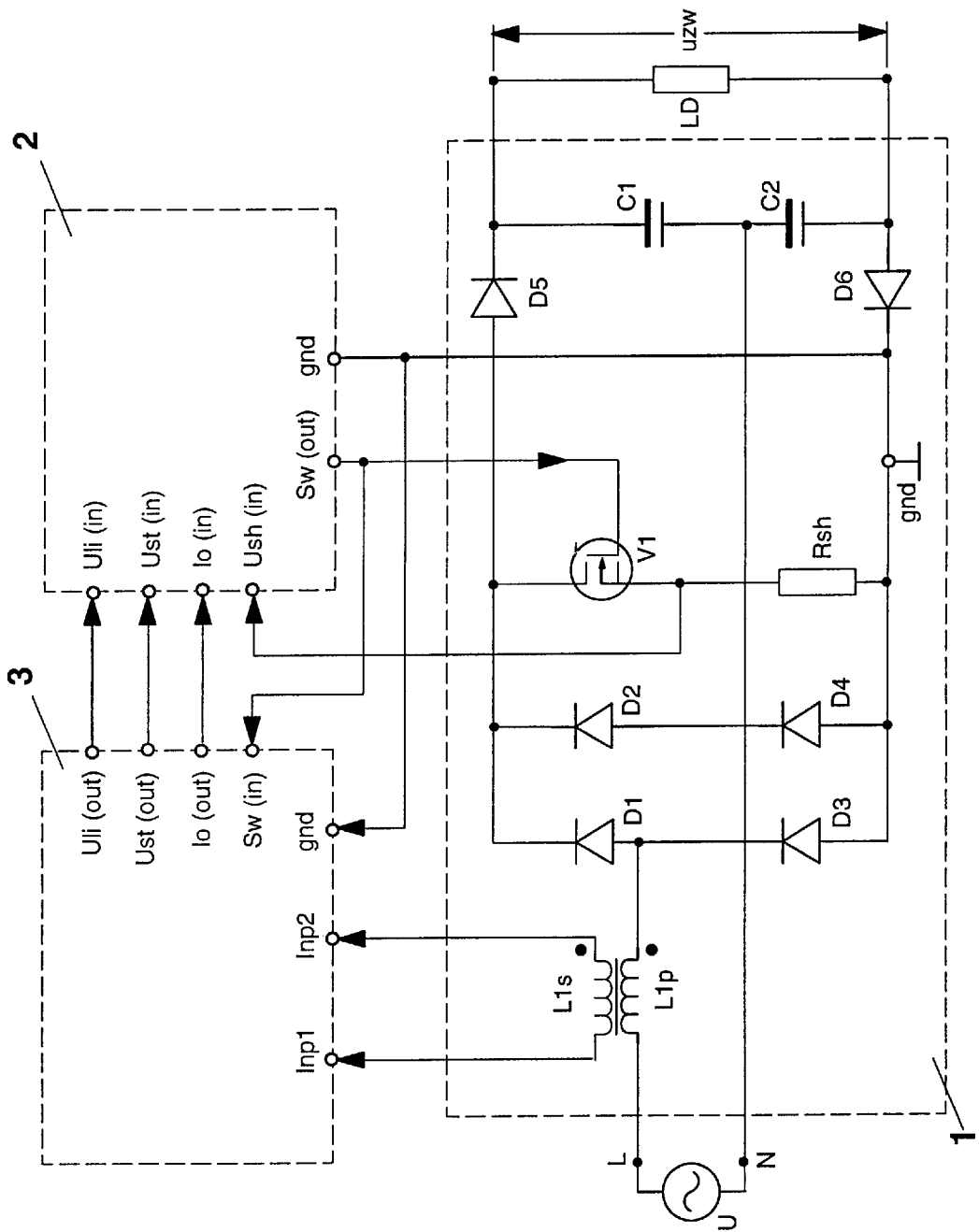

United States Patent
Twardzik

[19]

[11] Patent Number: 6,044,000
[45] Date of Patent: Mar. 28, 2000

[54] SWITCHED-MODE POWER SUPPLY HAVING SIGNAL EVALUATION UNIT CONNECTED TO A CHARGING INDUCTOR

[75] Inventor: Rene Twardzik, Traunreuth, Germany

[73] Assignee: Patent-Treuhand-Gesellschaft fuer elektrische Gluehlampen mbH, Munich, Germany

[21] Appl. No.: 09/250,196

[22] Filed: Feb. 16, 1999

[30] Foreign Application Priority Data

Mar. 3, 1998 [DE] Germany .......................... 198 08 890

[51] Int. Cl.[7] .................................................. H02M 5/42
[52] U.S. Cl. ................................................ 363/90; 323/222
[58] Field of Search .............................. 323/222; 363/90, 363/44, 45, 46

[56] References Cited

U.S. PATENT DOCUMENTS

| | | | |
|---|---|---|---|
| 5,321,299 | 6/1994 | Ohkawa et al. | 323/222 |
| 5,383,109 | 1/1995 | Maksimovic et al. | 323/222 |
| 5,705,894 | 1/1998 | Krummel | 315/119 |

*Primary Examiner*—Shawn Riley
*Attorney, Agent, or Firm*—Carlo S. Bessone

[57] ABSTRACT

A switched-mode power supply for supplying a DC-fed load (LD) by a stepped-up, stabilized DC voltage (uzw), which is formed from an AC mains voltage (U) by means of a rectifier circuit (D1 to D4), a charging inductor (L1), a switch (V1), which is controlled by a control unit (2) and has its switching path connected in parallel with outputs of the rectifier circuit, and also a charge storage arrangement (D5, C1, C2, D6), which is connected once again in parallel with the switching path of the said switch. In this case, the charge storage arrangement (D5, C1, C2, D6) comprises a series circuit of charging diodes (D5 and D6) and two storage capacitors (C1, C2), whose common junction point is connected to a neutral conductor terminal (N) of the rectifier circuit. The charging inductor (L1) is arranged in the line path, at high potential (L), between AC mains voltage (U) and the rectifier circuit and has an auxiliary winding (L1s), to which a signal evaluation unit (3) for the floating evaluation of the instantaneous charge state of the charging inductor is connected, in order to derive therefrom state control signals (Ul1, Ust, Io) for the control unit (2).

10 Claims, 4 Drawing Sheets

SWITCHED-MODE POWER SUPPLY HAVING SIGNAL EVALUATION UNIT CONNECTED TO A CHARGING INDUCTOR

The invention relates to a switched-mode power supply with active harmonics limiting.

Switched-mode power supplies of this type are used successfully in a plurality of applications. They are advantageous particularly when the DC supply to be delivered by the switched-mode power supply for the respective application requires a DC voltage potential which exceeds the peak value of the AC mains voltage which delivers the energy.

I. PRIOR ART

U.S. Pat. No. 5,705,894 discloses an entirely typical example of a switched-mode power supply designed with regard to such an application. This document describes an electronic ballast for operating one or else, if appropriate, a plurality of fluorescent lamps. The switched-mode power supply of the electronic ballast disclosed therein has, as input network, a rectifier bridge to which AC mains voltage is fed on the input side. At its output at high potential, the rectifier bridge delivers a pulsating DC voltage to a charging inductor which, for its part, is connected to a storage capacitor via a forward-biased charging diode. The second terminal of the said storage capacitor is connected to the rectifier-bridge output at low potential. At the two terminals of the storage capacitor, a stabilized, smoothed DC voltage is output as supply voltage for the connected electronic ballast. In order to step up the potential of this stabilized DC voltage in comparison with the pulsating DC voltage delivered by the rectifier bridge, a switch in the form of a power transistor is furthermore provided in parallel with the arrangement of charging diode and storage capacitor.

A circuit of this type serves to bridge the voltage difference between the instantaneous value of the AC mains voltage and the DC voltage across the storage capacitor. Specifically, if the power transistor is activated and the switch is thus closed, then the current in the charging inductor rises linearly. If the switch is opened by the power transistor being turned off when an intended end value is reached, then the current is discharged into the storage capacitor, it being assumed that the voltage across this storage capacitor is greater than the rectified mains voltage at the output of the rectifier bridge. At the next zero crossing of this discharge current, the power transistor is activated again, that is to say the switch is closed, with the result that the process described is repeated. The switching cycle proceeds at a multiple of the mains frequency, the desired value for the level of the current flowing through the charging inductor at which the power transistor is switched over, that is to say deactivated, corresponding to the instantaneous value of the pulsating DC voltage at the output of the rectifier bridge.

Such a configuration of a switched-mode power supply with a regulated step-up converter is very advantageous particularly when the level of the stabilized DC voltage to be produced at the output of the switched-mode power supply is not too large compared with the feeding AC mains voltage. However, the higher the difference of the output voltage of the switched-mode power supply, then the greater the volume and the more critical the dimensioning of the elements of the switched-mode power supply which determine the function of the step-up converter.

This was actually already realized, as taught by U.S. Pat. No. 5,383,109. This document discloses a power supply in the form of a switched-mode power supply with active harmonics limiting with which a defined, relatively elevated, stabilized DC voltage is produced even with a plurality of feeding AC mains voltages with different peak values. A plurality of embodiments of a regulated switched-mode power supply disclosed in this document essentially share the fundamental concept of doubling the components which are critical for the dimensioning and essentially determine the function of the step-up converter. In comparison with the prior art described above, then, in the case of the switched-mode power supplies disclosed in U.S. Pat. No. 5,383,109, the storage capacitor located at the output of the switched-mode power supply is replaced by the series circuit of two identical capacitors across each of which only half of the rectified output voltage is then present. In a similar manner, the single power transistor which realizes the switch in the step-up converter is replaced by the series circuit of two transistors and, finally, the charging inductor is divided into two inductors. However, this circuit design requires the junction points between the two storage capacitors and the two switching transistors in each case to be connected to the neutral conductor input of the rectifier bridge.

However, the regulated step-up converter always requires items of information about the instantaneous operating state of the switched-mode power supply itself, in order to be able to carry out regulation, that is to say to switch the switch of the step-up converter on or off at corresponding points in time. This relates to information about the instantaneous values of the current in the charging inductor, of the rectified AC mains voltage delivered by the rectifier bridge, and also of the stabilized DC voltage at the output of the switched-mode power supply. In the case of a conventional switched-mode power supply with regulated step-up converter, as described, for example, in U.S. Pat. No. 5,705,894 cited in the introduction, this information is in each case detected and picked off at elements of the switched-mode power supply which are arranged in the circuit arrangement downstream of the rectifier bridge. It is thus possible to refer all these signals to a common reference potential, which is usually the potential on the return line to the rectifier-bridge output at low potential. However, the solution disclosed in U.S. Pat. No. 5,383,109 does not disclose how the problem of detecting, in the switched-mode power supply, the items of information about its instantaneous operating state which are necessary for regulating the step-up converter is solved in the case of the changed circuit design.

II. SUMMARY OF THE INVENTION

The present invention is based on the object, therefore, of providing a further embodiment for a switched-mode power supply of the type mentioned in the introduction, which embodiment permits low-loss AC/DC conversion with cost-effective components using a stable regulating circuit even when the stabilized DC voltage produced in the process is at least twice as high as the peak value of the supplying AC mains voltage.

In the case of a switched-mode power supply of the type mentioned in the introduction, this object is achieved by means of the features described in the characterizing part of Patent claim 1.

In this solution, only the information about the switching state of the switch of the step-up converter is detected essentially as binary information directly at the switch itself. All other items of information about the instantaneous operating state of the switched-mode power supply, which are to be detected in particular as analogue signals, are in each case picked off via the auxiliary winding of the charging inductor connected between AC mains voltage and the rectifier bridge of the switched-mode power supply. Since the signal evaluation unit is put at a defined reference-earth potential, all the analogue state signals which are fed to this unit in a floating manner are referred to the identical reference-earth potential. They can thus be analysed in a reliable and, at the same time, simple manner in terms of circuitry in the signal evaluation unit and be converted into signals which can be processed as input signals in a conventional control unit of a regulated step-up converter. This solution makes it possible, on the one hand, to realize such a switched-mode power supply with cost-effective components under the abovementioned boundary conditions of a relatively large difference between the DC output voltage of the switched-mode power supply and the peak values of the feeding AC mains voltage and also, at the same time, to configure the corresponding regulating circuit for the step-up converter such that it is stable, using simple means.

III. DESCRIPTION OF THE PREFERRED EXEMPLARY EMBODIMENT

Figure 2:
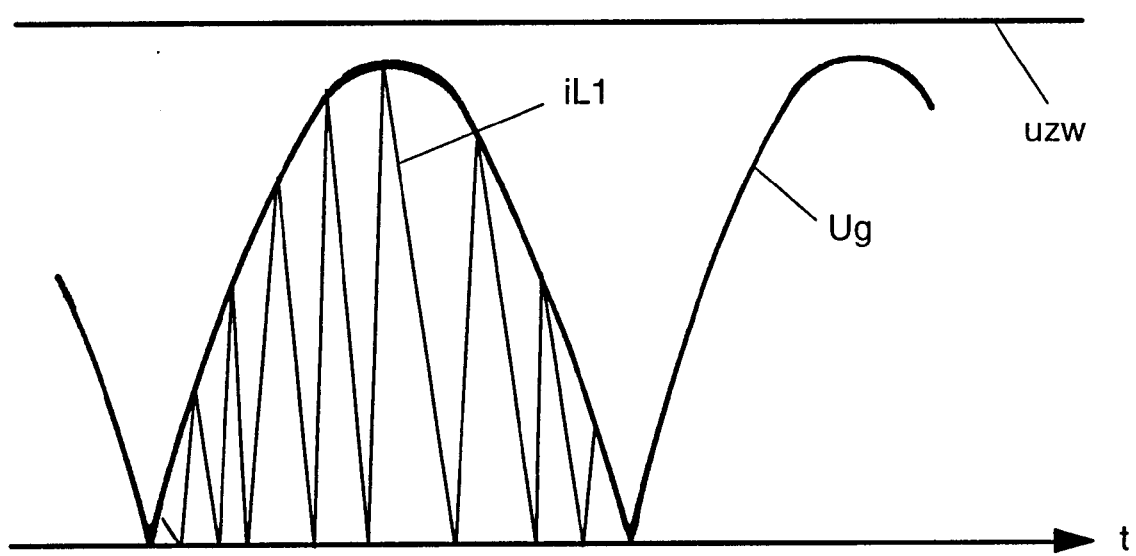
Figure 3:
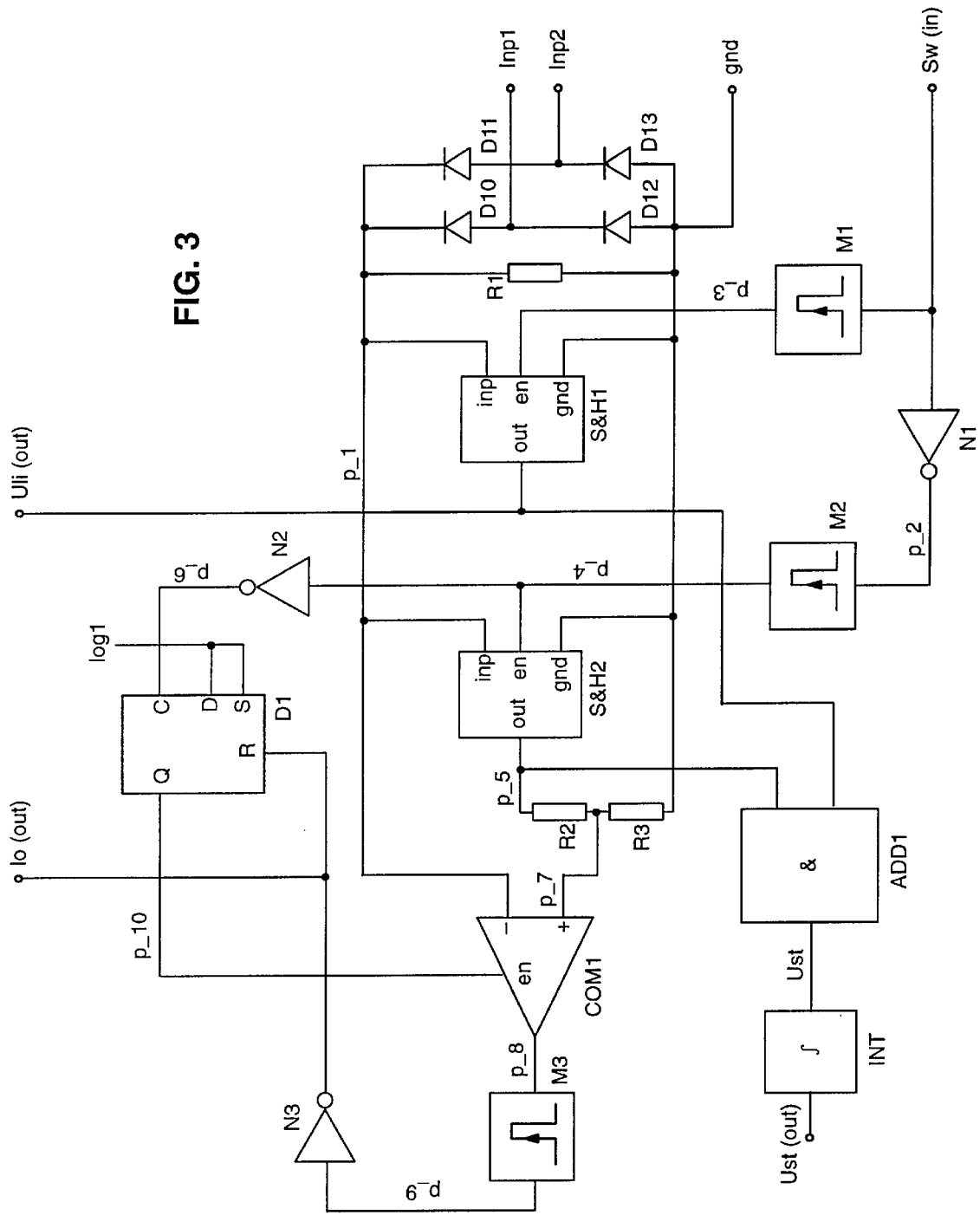
Figure 4:
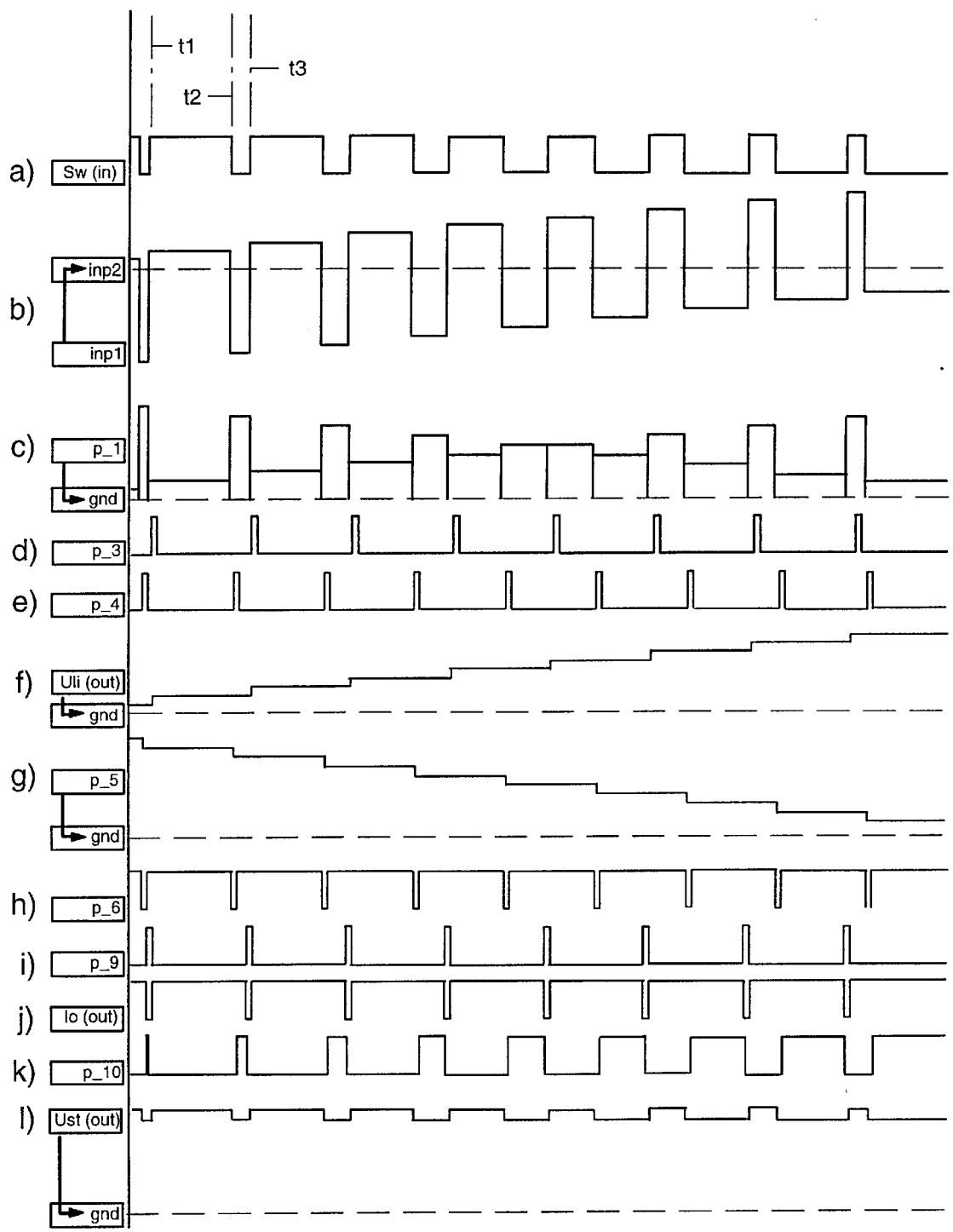

Further advantages of the solution according to the invention emerge from the following description of an exemplary embodiment. Such an exemplary embodiment of the invention is described in more detail below with reference to the drawing, in which:

FIG. 1 shows the discrete configuration of a switched-mode power supply with active harmonics limiting and also a control unit assigned to this switched-mode power supply, and furthermore a signal evaluation unit, FIG. 2 shows a timing diagram for illustrating the fundamental function of a switched-mode power supply with regulated step-up converter, FIG. 3 shows an embodiment of the signal evaluation unit, and FIG. 4 shows a series of timing diagrams for elucidating the function of the switched-mode power supply and of the signal evaluation unit assigned to the control unit.

FIG. 1 is subdivided into three function blocks and shows a switched-mode power supply 1 in a discrete circuit, and also, diagrammatically, a control unit 2 and a signal evaluation unit 3. The input side of the switched-mode power supply 1 is connected to mains AC voltage U, whose phase and neutral conductors are designated by L and N, respectively. A charging inductor L1 is connected to the phase L of the AC mains voltage U, which charging inductor has, in addition to a primary winding L1p, an auxiliary winding L1s wound in the same sense. The terminals of this auxiliary winding L1s are connected to signal inputs Inp1 and Inp2 of the signal evaluation unit 3. As will be able to be explained in detail later with reference to FIGS. 3 and 4, items of information about the instantaneous operating state of the switched-mode power supply 1 are fed to the signal evaluation unit 3 via the said signal inputs.

A rectifier arrangement comprising a bridge circuit of four diodes D1 to D4 is connected by a bridge input to a second terminal of the primary winding L1p of the charging inductor L1. The second bridge input of this rectifier arrangement is connected to the neutral conductor N of the AC mains voltage U. Consequently, a rectified, pulsating AC voltage Ug is present at two output-side terminals of the rectifier arrangement D1 to D4, the output-side terminal, at low potential, of the rectifier arrangement D1 to D4 being at a potential which forms a reference potential for the switched-mode power supply 1. Connected to these output-side terminals of the rectifier arrangement D1 to D4 is a charging storage arrangement formed from two respectively forward-biased charging diodes D5 and D6 and also two storage capacitors C1 and C2. In this case, the junction point between the storage capacitors C1 and C2, which are connected in series with one another, is connected to that bridge terminal of the rectifier arrangement D1 to D4 which is connected to the neutral conductor N of the AC mains voltage U. The two junction points between the first charging diode D5 and the first storage capacitor C1 and between the second storage capacitor C2 and the second charging diode D6 form the outputs of the switched-mode power supply 1. A stabilized DC voltage uzw, which is stepped up in comparison with the rectified AC mains voltage Ug, is offered at these outputs. A load Ld which is connected thereto and thus supplied with DC voltage is illustrated diagrammatically in FIG. 1. A multiplicity of possible applications emerge for a switched-mode power supply 1 of this type; for example, it may, in particular, also be used for the DC supply of an electronic ballast for operating fluorescent lamps. In this typical application, the rectified AC mains voltage Ug must be increased to a relatively high potential of the stabilized DC voltage uzw, which is usually referred to as the intermediate circuit voltage in these applications.

In order to enable this stepping-up of the intermediate circuit voltage uzw with regard to the rectified AC mains voltage Ug, the switched-mode power supply 1 furthermore has a switching transistor V1, whose switching path, connected in series with a detector resistor Rsh is connected, in parallel with the charge storage arrangement D5, C1, C2, D6, to the output-side terminals of the rectifier arrangement D1 to D4. With the aid of this switching transistor V1, it is possible, in the course of the stepping-up process, to bridge the voltage difference between the instantaneous value of the rectified AC voltage Ug and the intermediate circuit voltage uzw. Specifically, if the switching transistor V1 is activated (switch function "closed"), a shunt circuit with the charge storage arrangement D5, C1, C2, D6 is thus created. The consequence of this is that the current il1 in the primary winding L1p rises linearly. When an intended end value is reached, the switching transistor is deactivated (switch function "open"). As a result, the current il1 in the primary winding L1p of the charging inductor L1 is discharged—dependent on whether the positive or negative half-cycle of the mains period is instantaneously present—respectively into one or other of the two storage capacitors C1 and C2, under the assumption that the intermediate circuit voltage uzw is higher than the mains voltage U. This discharge process ends as soon as the current il1 in the primary winding L1p of the charging inductor becomes zero. The switching transistor V1 is reactivated at this instant, with the result that the processes described subsequently proceed anew. The instantaneous value of the rectified AC voltage Ug serves as desired value at which these discharge processes are initiated. Consequently, an essentially sinusoidal profile of the mains current is ensured, that is to say active harmonics limiting is achieved.

The circuit principle described applies to all known step-up converters and is realized with the aid of the control unit 2. This control unit 2 thus requires a specific item of information about the instantaneous state of the switched-mode power supply 1 in order to correspondingly effect the control processes at the switching transistor V1. In the case of conventional switched-mode power supplies with a step-up converter, the instantaneous value of the rectified AC voltage Ug is initially measured preferably by means of a resistive voltage divider at the output-side terminals of the rectifier arrangement D1 to D4. Furthermore, the instantaneous value of the current in the charging inductor must be detected in order to compare it with the instantaneous value of the rectified AC voltage Ug. This comparison, which is usually carried out by means of a comparator, leads to the comparator opening as soon as the actual value of the current il1 in the primary winding L1p of the charging inductor L1 exceeds the desired value predetermined by the rectified AC voltage Ug. Furthermore, it is necessary to detect the zero crossings of the current il1 in order to change over the switching transistor V1.

The switching processes of the step-up converter of the switched-mode power supply 1 which have been described above, in principle, are illustrated by way of example in a diagram in FIG. 2 In this diagram, the profile of the pulsating rectified AC voltage Ug is illustrated against a time axis t. At the same time, for a half-cycle, the sawtooth-like profile of the current il1 in the primary winding L1p of the charging inductor L1 is diagrammatically illustrated and, furthermore, the stabilized output voltage of the switched-mode power supply 1, the intermediate circuit voltage uzw, which lies above the peak values of the rectified AC voltage Ug is specified. These explanations, also when they are in combination, should be entirely sufficient in the present connection since a relevant person skilled in the art is thoroughly aware of the function of switched-mode power supplies with a regulated step-up converter.

However, in the case of conventional switched-mode power supplies with regulated step-up converter, all the items of information about the instantaneous state of the switched-mode power supply 1, to the extent described above, are usually drawn from this referring to the reference potential at the output-side terminal, at low potential, of the rectifier arrangement D1 to D4. In the case of the configuration of the switched-mode power supply 1 which has been described above with reference to FIG. 1, this is not readily possible, inter alia also because the charging inductor L1, connected upstream of the rectifier arrangement D1 to D4 for dimensioning reasons, is directly connected to AC mains voltage U. For this reason, the signal evaluation unit 3 is provided, to which the items of information about the instantaneous signal states in the switched-mode power supply 1 are fed in a floating manner via its signal inputs Inp1 to Inp2 connected to the auxiliary winding L1s. In the signal evaluation unit 3, the information fed thereto is then analysed and conditioned to form control signals for the control unit 2 which is constructed in a manner known per se.

FIG. 3 illustrates an exemplary embodiment of the configuration of the signal evaluation unit 3. The way in which the desired signal evaluation is carried out in the present case is explained below with reference to this FIG. 3.

As input circuit, the signal evaluation unit 3 has a further rectifier arrangement, which is connected to the two signal inputs Inp1 and Inp2 on the input side and is formed from a bridge circuit of diodes D10 to D13 with which a shunt resistor R1 is connected in parallel on the output side. The bridge terminal, at low potential, of this further rectifier arrangement D10 to D13 is connected to reference potential of the switched-mode power supply 1 via an earth terminal gnd in order to define a reference-earth potential. The AC voltage across the primary winding L1p of the charging inductor L1, which AC voltage is transformed by means of the auxiliary winding L1s, is thus rectified by means of the further rectifier arrangement D10 to D13 and further processed as voltage signal p_1 proportional to the inductor voltage.

Furthermore, it is necessary to supply the signal evaluation unit 3 with items of information about the instantaneous function of the switching transistor V1 of the switched-mode power supply 1. This information is picked off on the corresponding control line between the control unit 2 and the control input of the switching transistor V1 and fed to the signal evaluation unit 3 as switching control signal Sw(in). The signal evaluation unit 3 is provided with a first and a second monostable multivibrator M1 and M2, respectively, to which this signal is fed directly and, respectively, after having been inverted by means of a first inverter INV1. The output signal of the latter, that is to say the inverted switching control signal, is in this case designated by p_2. The output signals p_3 and p_4 of the two monostable multivibrators M1 and M2, respectively, thus provide, in a manner in each case delayed by the time constant of the multivibrators, an item of information about the instantaneous switching state of the switching transistor V1 "closed" and "open", respectively. These two output signals p_3 and p_4 are fed as enable signal in each case to a respective one of two sample/hold circuits S&H1 and S&H2. These two sample/hold circuits are also referred to reference potential. Furthermore, the voltage signal p_1 proportional to the inductor voltage is fed in each case to their signal inputs. The first sample/hold circuit S&H1 consequently stores the value of this proportional voltage signal p_1 at an instant in which the switching transistor V1 is activated (switching function "closed"). In this state, the entire instantaneous AC mains voltage U is dropped across the primary winding L1p, with the result that the voltage signal p_1 is proportional to the instantaneous value of the AC mains voltage U. The first sample/hold circuit S&H1 stores this value in analogue form and outputs it as output signal Uli at its output.

As soon as the switching transistor V1 is subsequently deactivated, a voltage corresponding to the difference between the instantaneous values of the intermediate circuit voltage uzw and of the mains voltage U is present across the primary winding L1p of the charging inductor L1. This difference voltage is transformed by means of the auxiliary winding L1s, rectified by means of the further rectifier arrangement D10 to D13 and stored as analogue value by the second sample/hold circuit S&H2. On account of the time constant of the second monostable multivibrator M2, this occurs with a predetermined delay relative to the actual switching-off process of the switching transistor V1. The two output signals Uli and p_5 of the two sample/hold circuits S&H1 and S&H2, respectively, are fed as input signals to an analogue adder ADD1. This analogue addition affords an item of information about the instantaneous value of the intermediate circuit voltage uzw. The signal which contains this item of information, that is to say is proportional to the intermediate circuit voltage uzw, is designated by Ust. During zero crossings of the AC mains voltage U, the information about the intermediate circuit voltage at the output of the analogue adder ADD1 may instantaneously fail momentarily. Therefore, an integration element INT is provided at the output of the analogue adder ADD1 and smoothes the output signal thereof. The output signal Ust (out) of the integration element INT is fed to the control unit 2.

The processes described are repeated with the cycle of the switching processes of the switching transistor V1, the analogue values stored in the sample/hold circuits S&H1 and S&H2 being updated each time.

Furthermore, it is necessary to detect the zero crossings of the current il1 in the primary winding L1p in order to identify the end of the discharge process and afterwards to reactive the switching transistor V1. For this purpose, a comparator COM1 is provided in the signal evaluation unit 3. A predetermined partial voltage of the output signal p_5 of the second sample/hold circuit S&H2, designated as further voltage signal p_7, is fed to the said comparator via a voltage divider R2, R3 connected to the output of the second sample/hold circuit S&H2 Furthermore, the voltage signal p_1 at the output of the further rectifier arrangement D10 to D13 is fed to the inverting input of this comparator COM1. The amplitude of this voltage signal p_1 tends abruptly to zero in the event of a zero crossing of the current il1, with the result that the comparator COM1 then outputs an output signal p_8 with a corresponding potential.

This ought to be the case, however, only when the sample process in the second sample/hold circuit S&H2 is unambiguously concluded. For this reason, the enable signal p_4 fed to this sample/hold circuit S&H2 is inverted by means of a second inverter N2 before being fed to the clock input of a D-type flip-flop D1 as clock signal p_6. The data and set inputs of the D-type flip-flop D1 are jointly hard-wired at high logic level ("log 1"). On account of the propagation times in the second inverter N2 and the D-type flip-flop, the latter outputs an output signal p_10 at high level only when the second sample/hold circuit S&H2 has definitely concluded the corresponding sample process. This output signal p_10 of the D-type flip-flop D1 is fed as enable signal to the comparator COM1. As a result, the latter can also be activated only when the corresponding sample process has been concluded beforehand in the sample/hold circuit S&H2. With the voltage drop of the voltage signal p_1 proportional to the inductor voltage, the comparator COM1 thus generates an output signal p_8, which activates a third monostable multivibrator M3. The output signal p_9 of the latter is inverted by means of a third inverter N3 and output as zero crossing signal Io to the control unit 2. In parallel with this, this zero crossing signal is fed to a reset input of the D-type flip-flop D1, with the result that it is reset to its starting state and thus inhibits the comparator COM1 at the same time.

FIG. 4 illustrates the profiles of the signals which have been explained in the above description of the signal evaluation unit 3, in the form of timing diagrams covering a range from 0 to $\pi/2$ of the period of the AC mains voltage U. In this case, the profile of the switching control signal Sw(in) fed to the signal evaluation unit 3 is illustrated in the form of a bipolar pulse train in row a). Row b) of FIG. 4 diagrammatically shows the voltage profile across the auxiliary winding L1s of the charging inductor L1. Correspondingly, row c) of FIG. 4 represents the voltage profile of the voltage signal p_1 which is proportional to the inductor voltage and is rectified by means of the further rectifier arrangement D10 to D13.

If the power transistor V1 is activated at an instant t1 with the positive edge of the switching control signal Sw(in), then the transformed instantaneous value of the entire inductor voltage is present across the auxiliary winding L1s of the charging inductor L1, which value is fed to the signal evaluation unit 3 via the inputs Inp1 and Inp2 and is diagrammatically illustrated in row b) of FIG. 4. As may be gathered from this pulse train in the rest of its profile, this value initially rises with each switching cycle of the switching transistor V1. The same also applies correspondingly, of course, to the rectified voltage signal p_1 which is derived therefrom and is proportional in this case to the inductor voltage, which voltage signal $p_{13}$ 1 is illustrated in row c) of FIG. 4.

With the positive edge of the switching control signal Sw(in), which occurs at the instant t1, the first monostable multivibrator M1 of the signal evaluation unit 3 is set and a first enable pulse of the output signal, illustrated in row d) of FIG. 4, of the first monostable multivibrator is thus generated with a predetermined delay. With this pulse, the first sample/hold circuit S&H1 is enabled to sample the voltage signal $p_{13}$ 1 proportional to the inductor voltage and, finally, to output it as proportional voltage signal Uli to the control unit 2.

At a later instant t2, which is determined by the regulating circuit realized in the control unit 2, the switching transistor V1 is deactivated and the discharge process of the charging inductor L1 into the storage capacitor arrangement C1, C2 is thus initiated. At this instant, the second monostable multivibrator M2 of the signal evaluation unit 3 is set in order to enable the second sample/hold circuit S&H2 with its output signals p_4. The pulse train of these enable signals for the second sample/hold circuit S&H2 is illustrated in row e) of FIG. 4. With the enable pulse which follows the instant t2 with a delay, the second sample/hold circuit S&H2 is enabled to sample the instantaneous value of the voltage signal p_1 and to store it, as is illustrated in the form of the output signal p_5 of the second sample/hold circuit S&H2 in row g) of FIG. 4.

As explained in detail during the description of the signal evaluation unit 3, the output signals of the two sample/hold circuits S&H1 and S&H2 are added in analogue form by means of the adder ADD1 in order to generate the signal Ust which is proportional to the intermediate circuit voltage uzw and whose profile is illustrated in row 1) of FIG. 4. For this signal, row 1) of FIG. 4 provides a direct illustration of the signal profile at the output of the adder ADD1, in order to illustrate the sampling gaps mentioned during the description of FIG. 3 and thus to show why it is practical subsequently to smooth this output signal of the adder ADD1 in the integration element INT.

The signal profiles illustrated in rows h) to k) of FIG. 4 illustrate the relationships governing how the zero crossings of the current il1 in the primary winding L1p of the charging inductor L1 are detected in particular with the aid of the comparator COM1 and the D-type flip-flop D1 assigned thereto. With the falling edge of the switching control signal Sw(in) at the instant t2, the clock pulse for the D-type flip-flop D1 is generated with the output signal p_6 of the second inverter N2. The previously inhibited comparator COM1 is thus enabled to evaluate the great drop, occurring at the instant t3, in the voltage signal $p_{13}$ 1 proportional to the inductor voltage—illustrated in row c) of FIG. 4. The said comparator sets the third monostable multivibrator M3 with its corresponding output signal p_8. As illustrated in row i) of FIG. 4, this multivibrator thereupon outputs an output pulse which, in inverted form, forms the corresponding zero crossing signal Io, as is illustrated in row j) of FIG. 4. Since the D-type flip-flop D1 is also reset with this pulse, the signal profile illustrated in row k) of FIG. 4 is produced for the enable signal $p_{13}$ 10 of the comparator COM1.

The processes described are then repeated in accordance with the switching cycle of the switching transistor V1, thereby producing the signal profiles illustrated in FIG. 4 as a function of the instantaneous value of the rectified AC mains voltage Ug, which instantaneous value rises in the further course of events.

What is claimed is:

1. Switched-mode power supply for supplying a DC-fed load by a stepped-up, stabilized DC voltage formed from an AC mains voltage by means of a rectifier circuit, a charging inductor, and a switch controlled by a control unit and having a switching path connected in parallel with dc voltage outputs of the rectifier circuit, and a charge storage arrangement connected in parallel with the switching path of the switch and having supply terminals for the DC-fed load for feeding in the stabilized DC voltage, characterized in that the charging inductor (L1) is arranged in a line path between a high potential (L) of the AC mains voltage (U) and the rectifier circuit (D1 to D4) and has an auxiliary winding (L1s) with terminals on a secondary side, a signal evaluation unit (3) for a floating evaluation of an instantaneous charge state of the charging inductor is connected to the auxiliary-winding terminals on the secondary side and also has signal outputs connected to assigned signal inputs of the control unit for transferring input control signals (Uli, Ust, Io) into the control unit.

2. Switched-mode power supply according to claim 1, characterized in that the charge storage arrangement (D5, C1, C2, D6) has a series circuit of two storage capacitors (C1, C2) each having first and second terminals, the first terminals are connected via a common junction point to a neutral conductor terminal (N) of the rectifier circuit (D1 to D4), and has a pair of charging diodes (D5, D6), each of the charging diodes are connected in a forward-biased manner, and are each arranged between one of the DC voltage outputs of the rectifier circuit and one of the second terminals of the storage capacitors, junction points between each one of the charging diodes (for example D5) and one of the storage capacitors (for example C1) forming supply terminals for the DC-fed load (LD) for feeding in the stabilized DC voltage (uzw), the switch is formed by a power transistor (V1) having a switching path in series with a series resistor (Rsh) and connected in parallel with the DC voltage outputs of the rectifier circuit.

3. Switched-mode power supply according to claim 2, characterized in that a control signal input of the control unit (2) is connected to a junction point between the series resistor (Rsh) and the switching path of the power transistor (V1), via which control signal input the control unit is fed a signal proportional to a current instantaneously flowing via the switching path of the power transistor, a control input of the power transistor is connected to a control signal output (Sw(out)) of the control unit, a control signal (Sw) transferred via the control signal output switches the power transistor on as long as a current through the inductor does not exceed a desired value derived from a rectified AC mains voltage (Ug) multiplied by a regulator voltage formed in the control unit.

4. Switched-mode power supply according to claim 2, characterized in that the signal evaluation unit (3) has a further rectifier arrangement (D10 to D13) connected to the terminals of the auxiliary winding (L1s) of the charging inductor and has a rectifier output, at low potential, connected via an earth line (gnd) to an output, at low potential, of the rectifier arrangement (D1 to D4) of the switched-mode power supply (1), and the signal evaluation unit includes two sample/hold circuits (S&H1 and S&H2) each having signal sample inputs connected to an output, at high potential, of the further rectifier arrangement and having enable inputs to which a switching control signal (Sw(in)) of the power transistor (V1) is fed directly or after having been inverted, whereby the sample/hold circuits respectively sample and buffer-store a signal (Uli), which is proportional to an instantaneous value of a voltage across the charging inductor (L1) of the switched-mode power supply (1), and a voltage proportional to an instantaneous value of a signal (p_5), which is formed from a difference between an intermediate circuit voltage (uzw) and the rectified AC mains voltage (Ug), in order to output to the control unit (2) an item of information (Ust(out), Uli(out)) about the charging inductor current (il1) and, respectively, a level of the intermediate circuit voltage (uzw).

5. Switched-mode power supply according to claim 4, characterized in that the signal evaluation unit (3) includes monostable multivibrators (M1 and M2) having outputs connected to the enable input of a respective sample/hold circuit (S&H1 and S&H2) and having inputs fed directly and, respectively, via a first inverter (N1) to the switching control signal (Sw) of the power transistor (V1).

6. Switched-mode power supply according to claim 5, characterized in that in order to generate a pulse signal (Io) corresponding to a zero crossings of the current (il1) of the charging inductor (L1) in the signal evaluation unit (3), a comparator (COM1) is provided which is connected by an inverting input to the output, at high potential, of the further rectifier arrangement (D10 to D13) and is coupled by a second input to an output of the second sample/hold circuit (S&H2) and outputs a signal (p_8) at an output, which signal rises to high potential in an opposite sense to a drop in the current (il1) in the charging inductor (L1).

7. Switched-mode power supply according to claim 6, characterized in that the comparator (COM1) is assigned a D-type flip-flop (D1) having a data input hard-wired at logic level "one", a clock input triggered by means of an enable signal (p_4) of the second sample/hold circuit (S&H2) and a signal output connected to an enable input of the comparator, such that the comparator is enabled only when a sample operation in the second sample/hold circuit is concluded.

8. Switched-mode power supply according to claim 7, characterized in that connected to the output of the comparator (COM1) is a series circuit comprising a further monostable multivibrator (M3) and a further inverter (N3), which outputs a pulse of a zero crossing signal (Io(out)) which is fed both to the control unit (2) as an input control signal (Io(in)) and to a reset input of the D-type flip-flop (D1).

9. Switched-mode power supply according to claim 8, characterized in that the signal evaluation unit (3) is provided with an analogue adder (ADD1) having signal inputs connected to signal outputs of the first and second sample/hold circuits (S&H1 and S&H2) and which generates an output signal (Ust) proportional to the intermediate circuit voltage (uzw).

10. Switched-mode power supply according to claim 9, characterized in that an integration element (INT) is connected to an output of the analogue adder (ADD1), an output signal Ust(out) of the integration element is fed to the control unit (2) as a signal proportional to an instantaneous value of the intermediate circuit voltage (uzw).

* * * * *